Patented Sept. 10, 1929.

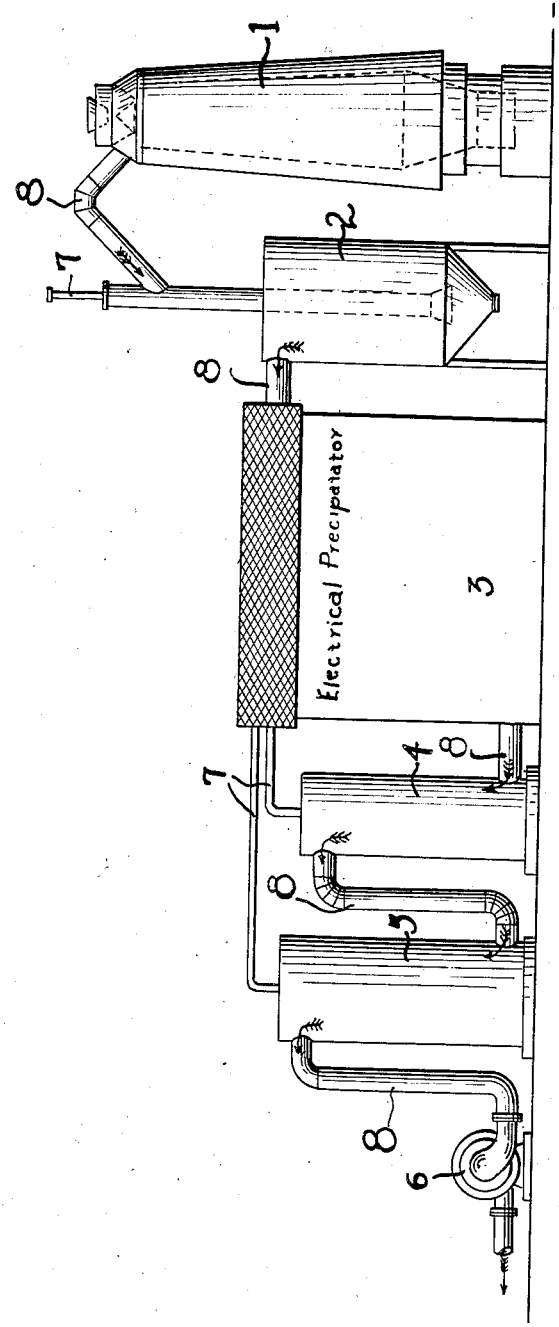

1,728,130

UNITED STATES PATENT OFFICE.

WALTHER MATHESIUS AND HANS MATHESIUS, OF CHARLOTTENBURG, GERMANY.

PROCESS OF PURIFYING GASES FROM BLAST FURNACES.

Application filed December 30, 1925, Serial No. 78,476, and in Germany January 3, 1925.

Our invention relates to improvements in the process of purifying gases from blast furnaces.

In the process of electrically separating the dust from the gases from blast furnaces the most minute particles of dust are separated only if the velocity of the gas is very low. Therefore, the gas being purified must be passed through purifying apparatus having a large cross-sectional area. Therefore the said purifying apparatus are expensive and much room is required for erecting the same, which room cannot always be provided for this purpose.

The microscopic investigation into the character of the said dust deposited under varying conditions by the action of the electric current has shown that the particles of the dust of the said gases are very different in size. Evidently the dust comes from two entirely different sources, one part of the said dust being already contained in the charge of the blast furnace in a state of fine distribution and being separated from the said charge by the high velocity of the blast. Another part of the dust, the particles of which are much smaller in size, is produced by sublimation or chemical reaction of different kinds, which reactions take place in the lower parts of the blast furnace and result into exceedingly fine bodies floating in the gas coming from the blast furnace. Between the sizes of the said parts of the dust there is a wide range including practically no dust at all.

By means of electric purification those parts of the dust can be readily separated from the gas flowing at high velocity, which are transmitted into and carried away by the gases in a mechanical way, while the finest particles produced by sublimation or chemical reaction can be separated by electric current only if the velocity of the flowing gas is exceedingy low.

As is known in the art, the fine particles of the dust can be separated by wet purification. But practical experience has shown that a large volume of water at low temperature is needed for separating the said finest particles of the dust.

Further, it has been suggested to precipitate the said most minute particles by generating a fog within the gases. But also this method has not proved satisfactory, the physical conditions of the formation of the fog in flowing gases not having been sufficiently recognized. There are three points which require particular attention:

First, it is impossible to produce a fog within a gas the temperature of which is higher than about 40° C. Even if a very large amount of steam is passed into the gas, the gas remains perfectly clear and transparent. A fog is produced only if the temperature is below 40° C. If particles of different sizes are present in the gas, the drops of fog are produced at first exclusively on the particles of larger size by reason of the greater mass thereof. By the condensation of the steam the mass of the said particles is materially increased, and they have an increased attraction on the steam being condensed, so that the steam is condensed exclusively on the said larger particles, while the finer particles, which should be deposited by the formation of the fog, remain dry and are not deposited. An increase of the amount of steam cannot have a useful result, because the steam is deposited on the drops of the fog formed within the gas and on the larger particles, so that the finest particles remain dry and are not separated notwithstanding the increased amount of steam.

Further, it has not been clearly understood that the formation of fog requires time, because the condensation of the steam takes place only at a temperature below 40° C., and the condensation of the steam at the said low temperature and under the comparatively low pressure takes place only very slowly.

In order to show diagrammatically a system in which this invention may be realized we have illustrated it in a figure where 1 represents a blast furnace, 2 represents a chamber where large particles will drop out of the gas stream by their own weight; 3 represents an electrical precipitator; 4 is a first fog producing apparatus; 5 is a second fog producing apparatus and 6 is a centrifugal device. Water is fed into the gas stream through pipes 7 and the various parts of the apparatus are connected for gas flow by large pipes 8. The operation of this device will be obvious from the following disclosure.

Our invention is based on the discovery of the said physical facts, and it consists in separating the coarser particles of dust carried into the gases in a mechanical way by electric current, and thereafter depositing the finest particles produced by sublimation or chemical reaction by means of fog acting thereon for certain lengths of time, the gases remaining for a certain length of time within rooms having a temperature below 40° C., so that comparatively large drops of fog are produced, which can be readily separated from the flowing gases by centrifugal action, the amount of water required in the process being comparatively small. Therefore two important results are obtained: First, the size of the electrical purifying apparatus can be so small that the electrical purification can be carried out with the gas flowing at comparatively high velocity. The apparatus can be provided within comparatively small spaces and at low cost. And second, the wet purification following the electrical purification can be completed with a small amount of water and with a comparatively small consumption of energy.

It is known to those skilled in the art that floating particles of dust can be separated from the gases by centrifugal action, if the particles are accelerated by centrifugal force so far that they can pass through the surface tension of the surface of water covering the stationary parts of the centrifugal separating apparatus or fans. The larger the particles of the fog within the gases are, the smaller is the mechanical acceleration needed for separating the same.

For producing sufficient formation of fog it is not necessary to add steam to the gases, but it is sufficient to add comparatively small amounts of water in a state of fine distribution to the gases, if the temperature of the said water is about 35° C., the temperature of the gases being sufficient to insure sufficient vaporization. By the rapid vaporization of the water the temperature of the gases is reduced below 40° C., by means of comparatively small amounts of water, so that a fog can be produced.

The condensation of the steam takes place more completely, and large drops of fog are produced, if the temperature of the gases is reduced to about 25° C. by making a second injection of finely distributed cold water.

Our improved process is carried out as follows:

The gases from the blast furnace are at first roughly purified by means of dust pockets or similar apparatus, thereafter they are subjected to electrical purification in apparatus the dimension and operation of which is such that the dust carried into the gases in a mechanical way is as far as possible completely deposited. In this step of the process the temperature of the gases should not be below 40° C., in order to prevent condensation of the steam and sticking of the dust on the parts of the apparatus. Thereafter the flowing gases are successively passed through two apparatus provided with means for producing fog, which apparatus consist of large chambers erected from any suitable material and having supplies of water in a state of fine distribution, the water supplied to the first chamber having a temperature of about 35° C., while the temperature of the water supplied to the second chamber is as low as possible.

The drops of fog thus produced are separated from the gas by centrifugal action within a Theisen washer or fan. By the condensation of a part of the steam within the second one of the said apparatus and the production of larger drops of water the amount of the particles of dust is materially reduced, the said drops being deposited within the said apparatus by gravity. Therefore the work to be performed within the Theisen washers or fans is reduced, so that Theisen apparatus or fans of small size may be used for purifying a large volume of gas.

As appears from the foregoing description, our improved system may be used for supplementing old plants which are not sufficient for purifying large amounts of gas or completely separating the dust, by providing electrical purifying apparatus of small size and two simple fog producing apparatus, so that the efficiency of the plant is satisfactory.

When purifying gases contain much steam sufficient fog is produced by cooling the gas to a temperature below 40° C.

We claim:

1. The herein described process of purifying blast furnace exit gases which consists in electrically separating a part of the dust contained within the gases, and thereafter separating the remainder of the dust by wet purification, said wet purification being effected by causing the gases to travel at a low velocity while producing a fog therein and thereafter precipitating the fog by subjecting the gases carrying the fog to a centrifugal treatment.

2. A process of treating blast furnace exit gases carrying dust in the form of relatively coarse particles and fume in the form of extremely fine particles, which comprises passing the gases through an electrical dust separator, wherein the coarser dust is withdrawn from the gas stream, then moistening and cooling the gases sufficiently to form a fog therein, and subjecting such fog to a centrifugal treatment sufficient to precipitate the same.

3. A process of treating blast furnace exit gases carrying dust in the form of relatively coarse particles and fume in the form of extremely fine particles, which comprises passing the gases through an electrical dust separator, wherein the coarser dust is separated from the gases, then moistening and cooling the gases in a plurality of stages sufficiently to form a fog therein, and subjecting such fog to a precipitation treatment.

In testimony whereof we hereunto affix our signatures.

WALTHER MATHESIUS.
HANS MATHESIUS.